(12) United States Patent
Lecomte et al.

(10) Patent No.: US 8,094,953 B2
(45) Date of Patent: *Jan. 10, 2012

(54) ADAPTIVE AND PROGRESSIVE PROTECTION OF FIXED IMAGES ENCODED IN WAVELETS

(75) Inventors: Daniel Lecomte, Paris (FR); Daniela Parayre-Mitzova, Paris (FR); Jerome Caporossi, Bourg-la-Reine (FR)

(73) Assignee: Querell Data Limited Liability Company, Dover, DE (US)

( * ) Notice: Subject to any disclaimer, the term of this patent is extended or adjusted under 35 U.S.C. 154(b) by 445 days.

This patent is subject to a terminal disclaimer.

(21) Appl. No.: 12/408,877

(22) Filed: Mar. 23, 2009

(65) Prior Publication Data

US 2009/0180613 A1    Jul. 16, 2009

Related U.S. Application Data

(63) Continuation of application No. 11/167,783, filed on Jun. 27, 2005, now Pat. No. 7,529,415, which is a continuation of application No. PCT/FR2003/050192, filed on Dec. 19, 2003.

(30) Foreign Application Priority Data

Dec. 31, 2002  (FR) ..................................... 02 16916

(51) Int. Cl.
   *G06K 9/36*       (2006.01)
(52) U.S. Cl. ........ 382/232; 382/233; 382/240; 382/251; 382/250; 382/100; 380/210
(58) Field of Classification Search .................. 382/232, 382/233, 240, 250, 251, 253; 725/31, 90, 725/104, 146, 87
   See application file for complete search history.

(56) References Cited

U.S. PATENT DOCUMENTS 7,349,542 B2 *  3/2008  Fekri ............................ 380/263
(Continued)

FOREIGN PATENT DOCUMENTS

EP          0920209           6/1999
(Continued)

OTHER PUBLICATIONS

Li Gong et al., "Elements of Trusted Multicasting," Network Protocols, 1994, Proceedings, 1994 International Conference on Boston, MA, USA, Oct. 25-28, 1994, Los Alamitos, CA, USA, IEEE Comput. Soc., pp. 23-28.

(Continued)

*Primary Examiner* — Samir Ahmed
*Assistant Examiner* — Ali Bayat
(74) *Attorney, Agent, or Firm* — Connolly Bove Lodge & Hutz LLP

(57) ABSTRACT

A process for secured distribution of fixed numerical images according to a nominal format resulting from numerical encoding in wavelets, represented by a original stream including a packet relating to organization of a binary sequence that contains at least a block that regroups numerically encoded simple elements according to a mode specified inside the stream and utilized by decoders that are capable of reconstructing or decoding it to be able to correctly display the image including modifying at least one of the simple elements according to at least a substitution operation including extracting the simple element, followed by its replacement by lure data, modifying a principal stream to conform to a nominal format including modified blocks and packets, and by a path that is separate from the principal stream of complementary numerical information and allowing reconstruction of the original stream from calculations, on destination equipment, as a function of the principal stream and the complementary information.

28 Claims, 1 Drawing Sheet

U.S. PATENT DOCUMENTS

| | | | |
|---|---|---|---|
| 2001/0051881 | A1 | 12/2001 | Filler |
| 2003/0128845 | A1* | 7/2003 | Kudumakis .................. 380/210 |
| 2003/0161141 | A1* | 8/2003 | Kotovsky ...................... 362/147 |
| 2003/0161411 | A1 | 8/2003 | McCorkle et al. |
| 2004/0141651 | A1 | 7/2004 | Hara et al. |
| 2006/0064233 | A1* | 3/2006 | Adachi et al. ................. 701/117 |

FOREIGN PATENT DOCUMENTS

| | | |
|---|---|---|
| EP | 1011269 E | 6/2000 |
| EP | 1033880 | 9/2000 |

OTHER PUBLICATIONS

Wenjun Zeng et al., "Efficient Frequency Domain Video Scrambling for Content Access Control," ACM Multimedia, Proceedings of the International Conference, New York, NY, US, Oct. 30, 1999, pp. 285-294.

Chang-Tsun Li et al., "Image Authentication and Integrity Verification via Content-Based Watermarks and a Public Key Cryptosystem," Proceedings 2000 International Conference on Image Processing, Proceedings of 7th IEEE International Conference on Image Processing, Vancouver, BC, Canada, Sep. 10-13, 2000, vol. 3, pp. 694-697.

Susie J. Wee et al., "Secure Scalable Video Streaming for Wireless Networks," 2001 IEEE International Conference on Acoustics, Speech and Signal Processing, Proceedings (ICASSP), Salt Lake City, UT, May 7-11, 2001, IEEE International Conference on Acoustics, Speech and Signal Processing (ICASSP), New York, NY, IEEE, US, vol. 6, of 6, pp. 2049-2052.

* cited by examiner

ADAPTIVE AND PROGRESSIVE PROTECTION OF FIXED IMAGES ENCODED IN WAVELETS

RELATED APPLICATION

This is a continuation of International Application No. PCT/FR2003/050192, with an international filing date of Dec. 19, 2003 (WO 2004/062287, published Jul. 22, 2004), which is based on French Patent Application No. 02/16916, filed Dec. 31, 2002.

FIELD OF THE INVENTION

This invention concerns processing of numerical images encoded in wavelets, in particular, systems that allow visual scrambling and recomposition of a fixed image encoded in wavelets.

BACKGROUND

It has been a problem to provide a procedure that is capable of transmitting, in a secured way, numerical data that correspond to high quality images in any numerical format, from an encoding in wavelets, live or pre-recorded to a visualization screen and/or for being recorded on a hard disk or a completely different back-up device belonging to a box that connects a remote transmission network to a display of the monitor type or a television screen, all while preserving visual quality, but avoiding fraudulent utilization such as the possibility of making pirated copies of numerically encoded images and recordings on a back-up support of the decoder box.

The traditional techniques of cryptography consist in general of combining (according to operations such as addition or subtraction) the data of a source with values generated in a pseudo-random way and from an initialization key (encryption key). Simple possession of the key thus allows the complete decryption of the encrypted data, those that contain in substance the totality of the original information.

EP 1 011 269 A1 discloses a method for encryption of an information signal that can be applied in the case of fixed images. The method adds to an original signal that is not compressed a pseudo-random noise to obtain a new signal. The signal encrypted in this way is next compressed with the aid of standard, adequate algorithms, then transmitted. The key itself is transmitted, in a secure manner, to the future user of the encrypted signal. The authors indicate that such a method can be applied in the case of encoded images of the standard JPEG. No reference is made to the case of images encoded by wavelets. Moreover, possession of the key conditions decryption of the transmitted signal.

EP 0 920 209 A1 discloses two processes of scrambling as well as their associated descrambling procedures to protect video data encoded according to standard MPEG-2. These processes act on at least a block of DC and AC coefficients resulting from the transformation DCT and for at least an image intra I. According to the first procedure, collection of coefficients AC of at least a block of coefficients (DC, AC) of at least an image I, undergo a permutation of order R. The associated descrambling procedure consists of transmitting the parameter R to execute the inverse and rebuild the original MPEG-2 stream. The collection of original data is therefore always present in the protected stream. According to the second procedure, coefficient DC of at least a block of coefficients (DC, AC) of at least an image I, is recalculated with the aid of an action command that could be random. Nevertheless, for the descrambling, all the data of the reconstitution of the aforementioned original stream (the order R, the original coefficients DC encrypted with the aid of a key), in such a way that all the data that constitute it are comprised in the protected MPEG-2 stream and dispatched together and through the same route, the protected MPEG-2 stream that contains the information for the reconstruction being the unique output data of the scrambling process. Consequently, this former method does not satisfy the criteria of high security.

Another reference is Zing W et al., published in the ACM Multimedia Proceedings of the International Conference on October 1999 and titled "Efficient Frequency Domain Video Scrambling for Content Access Control." That article discloses a method to protect the numerical data that encode multimedia content. The method is based on a collection of three basic pseudorandom operations (bit inversion, permutation and rotation of the block of coefficients) that can be combined and controlled by the encryption keys. The content collection resides in the protected stream and can be accessed by encryption keys that will be transmitted to authorized users. In this former method, collection of original data are present in the protected stream and access to the original content is completely conditioned upon possession, or not, of encryption keys. This former method thus does not solve the security problem.

SUMMARY OF THE INVENTION

This invention relates to a process for secured distribution of fixed numerical images according to a nominal format resulting from numerical encoding in wavelets, represented by an original stream including a packet relating to organization of a binary sequence that contains at least a block that regroups numerically encoded simple elements according to a mode specified inside the stream and utilized by decoders that are capable of reconstructing or decoding it to be able to correctly display the image including modifying at least one of the simple elements according to at least a substitution operation including extracting the simple element, followed by its replacement by lure data, modifying a principal steam to conform to a nominal format including modified blocks and packets, and by a path that is separate from the principal stream of complementary numerical information and allowing reconstruction of the original steam from calculations, on destination equipment, as a function of the principal stream and the complementary information.

This invention also relates to apparatus for the secured distribution of fixed numerical images according to a nominal stream format according to the process for secured distribution of fixed numerical images, including an encoder that sets into motion a numerical encoding into wavelets according to the nominal format, means of transmission of a numerical stream, means for processing an original stream that includes modifying at least one of the simple elements of the principal stream, and means to transfer the complementary information corresponding to the modification.

This invention further relates to apparatus for restitution of fixed numerical images according to a nominal format of images according to the process for secured distribution of fixed numerical images, including a decoder according to the nominal format, means of reception of a numerical stream, means of reception of complementary information associated with the principal stream, and means for reconstruction of the original stream by processing the principal stream and the complementary information.

This invention still further relates to a system for protected distribution of fixed numerical images including at least one distributing device of fixed images numerically encoded into wavelets and a plurality of devices of restitution and means of telecommunication linking broadcast equipment and the restitution equipment, wherein the broadcast equipment includes means to modify at least one of the simple elements of the principal stream, wherein the means of telecommunication are composed of the first means for transmission of principal information encoded into wavelets and second means to transfer complementary information that corresponds to the modification, the restitution equipment includes means for reconstruction of the original stream by processing the principal stream and the complementary information and means to decode the information coming from the first means of transmission.

DETAILED DESCRIPTION

Figure 1:
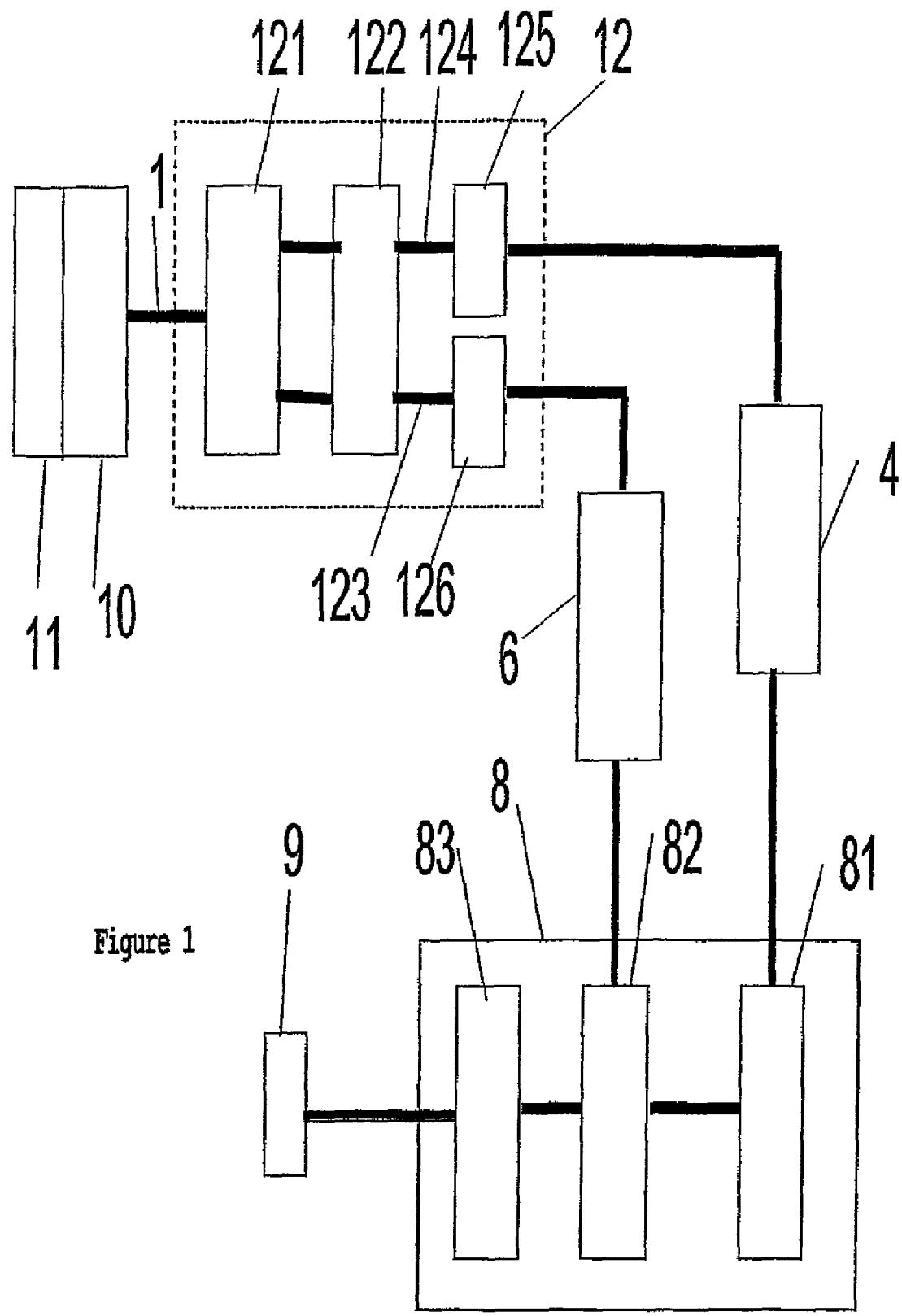
FIG. 1 schematically represents one aspect of a client-server system in accordance with aspects of the invention.

This invention provides a device capable of transmitting in a secured manner a collection of numerical images of high visual quality to a display and/or for storing in the memory of a back-up device of a box that connects a transmission network to the display, this all while preserving the visual quality, but avoiding the possibility that the images can be illicitly copied.

The invention concerns a process for securely distributing numerical, fixed images according to a nominal format resulting from encoding in wavelets, represented by a binary stream that includes at least a packet (relative to the organization of the binary sequence) that contains at least a block that contains simple elements (for example, coefficients) numerically encoded according to a mode specified inside the concerned stream and utilized by all the decoders that are capable of reconstructing it or decoding it to be able to display it correctly. The process includes:

a preparatory stage comprising modifying at least one of the simple elements according to at least a substitution operation that comprises extraction of the simple element, followed by its replacement by data called lure, a transmission stage:

of a principal stream conforming to a nominal format, comprising the blocks and packets modified during the preparatory stage and through a channel separate from that of the principal stream of complementary numerical information that allows reconstruction of the original stream from a calculation on the destination equipment, and as a function of the principal stream and the complementary information. The "complementary information" is defined as a collection that constitutes data (for example, coefficients that describe the original numerical stream or extracts of the original stream) and functions (for example, the substitution or permutation function). One function is defined to contain at least an instruction that matches up the data and the operators. The complementary formation describes the operations to execute to recover the original stream at the start of the modified stream.

A "stream" is defined as a structured binary sequence, constituting simple and ordered elements that represent the base form of the encoding of the data and compliant with a standard or a norm for audiovisual data.

The act of having removed a part of the original data of the stream of origin, at the time of generating a modified principal stream, does not allow reconstruction of the stream of origin, from only data of the modified principal stream, the modified stream is thus called "secured stream." A "secured distribution" is a distribution of secured stream.

The term "scrambling" means modification of a numerical binary stream according to appropriate methods In a way that the stream remains in conformity with a standard with which it was encoded numerically, all for displaying it on a screen, but altered from the viewpoint of the human visual perception.

The term "descrambling" means a reconstruction process of the initial stream by appropriate methods, the binary stream restored after descrambling being identical, therefore without loss, to the initial binary stream.

Advantageously, the binary stream restituted after descrambling has a size that has a form that is different from that of the initial binary stream, following addition of neutral data for the decoder. However, it remains in conformity with the standard or norm of the original binary stream, and produces a decoded image that is visually and numerically strictly equal to the image decoded from the original binary stream.

The term "scalabilité granulaire" translates to the expression in English "granular scalability." The scalability property characterizes an encoder that is capable of encoding or a decoder that is capable of decoding an ordered collection of binary streams to produce or reconstruct a multi layer sequence. The "granularity" is defined as the amount of information that can be transmitted by a layer of a system characterized by whatever scalability, whereby the system also qualifies as "granular."

This invention provides the protection of the numerical image encoded in wavelets based integrally on the structure of the bitstream (binary sequence), protection that comprises modifying targeted parts of the bitstream relating to the modeling by wavelets and their characteristics. Real values are extracted from the bitstream and stored as well as the complementary information, and are in their turn sent the random values or calculated or the permuted values, of the same size as the original values, and that for the totality of the numerical stream. Advantageously, the replacement values have a size different from the original values. Thus, the scrambler adds "lures" for the decoder, which receives as input a binary stream completely in conformity with the numerical format of origin, but from which the decoded and displayed image is not acceptable from the point of view of the human visual perception. The scrambling module executes an analysis of the bitstream and selects locations where it introduces perturbations. A perturbation is defined as a change (for example, of the value, sign inversion, saturation, thresholding or the like), or a substitution by a random or calculated value, or a permutation. The achieved scrambling-descrambling procedure is without quality loss of the original image.

Advantageously, the scrambling operation is also achieved with a partial decoding-encoding of the bitstream that represents the encoded image. Modifications are then directly applied to coefficients of the decoded wavelets, the original wavelet coefficients are stored as complementary information and coefficients of the modified wavelets are re-encoded to generate a principal stream that is modified to conform to a standard or the norm of the initial stream.

Contrary to the majority of the known encoding systems, the principle described below makes it possible to ensure a high level of protection while reducing the volume of information necessary for decoding.

Protection, realized in conformance with this invention, is based on the principle of suppression and replacement of information that encodes the original visual signal by whatever method, that is to say: substitution, modification, permutation, or displacement of information. This protection is also based on the knowledge of the structure of the stream at the output of the visual encoder: scrambling depends on the content of the numerical stream.

Reconstitution of the original stream takes place on the destination equipment from the modified principal stream that is already present or available (for example, on a CD, DVD or the like) or dispatched in real time on the destination equipment and the complementary information dispatched in real time at the moment of the visualization that comprise the data and functions executed with the aid of numerical procedures (collection of instructions).

Moreover, when the order of the packets within the modified principal stream is changed according to an operation of code conversion after the preparatory stage and/or before, during or after the transmission stage, the complementary information, stored at the time of the preparatory stage and transmitted on the destination equipment, also allows reconstruction of the original content from the modified principal stream.

In the same way, when a sub collection of packets of the modified principal stream is received on the destination equipment, only the part of the complementary information that corresponds to this sub collection of modified packets is transmitted on the destination equipment.

Advantageously, the reconstruction stage introduces, according to a fixed mode, data, neutral for the decoder, in the stream reconstructed from the modified principal stream, to modify the size of the reconstructed stream all while preserving its conformity vis-á-vis the norm or the native standard, as well as the numerical and qualitative equality of the decoded image and the image decoded from the original stream.

Knowing the way in which modeling, compression and encoding in wavelets of the image by the encoder in wavelets and/or the standard or norm given is carried out, it is possible to extract from the bitstream the principal parameters which it describes and are dispatched to the decoder.

Once these parameters are identified, they are modified in a way such that the numerical stream, generated by the encoder and/or the standard given, is modified, but in conformity with the encoder and/or this standard. The structured binary stream represents the image encoded in wavelets. Advantageously, it can represent a succession of numerical images resulting from encoding in wavelets. The modifications render the image, resulting from the encoding of the stream, unusable for the user because it is scrambled. However, the stream can be understood and interpreted by the appropriate decoder, without that the latter is perturbed, and displayed on a screen.

Modification of one or various components of the numerical stream brings about a degradation of the image from a visual point of view and transforms it into a signal that is completely incomprehensible and unpleasant from the viewpoint of human visual perception.

This invention concerns a process for protected distribution of numerical fixed images according to a nominal format resulting from numerical encoding in wavelets, represented by an original stream comprising at least one packet (relative to organization of the binary sequence) that contains at least one block that regroups the simple elements (for example, coefficients) numerically encoded according to a mode specified inside the concerned stream and utilized by all the decoders that are capable of reconstructing it or decoding it to be able to correctly display the image that comprises:

a preparatory stage that comprises modifying at least one of the simple elements according to at least a substitution operation that comprises extraction of the simple element, followed by its replacement by data called lure, a transmission stage:

of a principal stream modified to conform to a nominal format, comprising blocks and packets modified during the preparatory stage, and by a route that is separated from the principal stream of complementary numerical information that allows reconstruction of the original stream from calculations, on the destination equipment, and as a function of the principal stream and the complementary information.

In one aspect, the modified principal stream is recorded or available on the destination equipment before transmission of the complementary information on the destination equipment. In another aspect, the modified principal stream and complementary information are transmitted together in real time at the moment of visualization.

Moreover, the format of the nominal flux resulting from encoding in wavelets is defined by a standard or an encoder common to a community of users.

Advantageously, the process contains a stage of analysis of at least a part of the original stream, the analysis stage determining the nature of the modifications to be made to the simple elements.

Moreover, the stage of determination of the modification of the simple elements, to be carried out at the time of the stage of analysis, takes into account the concrete structure of at least a part of the original image.

According to one aspect, the process comprises a stage before analog/numerical conversion under a structured format, the process being applied to an analog visual signal. Advantageously, the complementary information comprises at least a numerical routine that is capable of executing a function.

According to one aspect, the preparatory stage of modification is carried out in an adaptive way on the original stream according to at least a part of the characteristics representative of the structure, contents and parameters of the original image, profile of the recipient, and external events. Moreover, the modified principal stream conforms to a standard or a native standard of the original stream. Advantageously, the size of the modified principal stream is strictly equal to the size of the original stream.

Advantageously, the modifications carried out at the time of the preparatory stage are carried out directly on the packets of the initial binary stream gathering blocks of encoded simple elements. Preferably, the modifications carried out at the time of the preparatory stage are carried out directly on at least one packet of the simple elements obtained by decoding at least one packet of the initial binary stream.

In another aspect, modifications are carried out on at least one of the layers of spatial scalability of the fixed images encoded in wavelets. Modifications may also be carried out on at least one of the layers of qualitative scalability of the fixed images encoded in wavelets. Preferably, the modifications are carried out on at least one collection of at least one simple element as a function of the parameters of the modifications carried out beforehand on at least one collection of at least one simple element within the same stream.

In yet another aspect, the fixed images constitute a succession of images in time. Moreover, the modification of the simple elements is different for at least two of the succession of images. Advantageously, the modification of the simple elements of an image of the succession of images includes modification of the simple elements of the preceding images in the temporal order of succession, while being based on the properties of the spatial and qualitative scalability of the transformations into wavelets.

According to one aspect, modification of the simple elements is applied to only the spatial part of the image, determined by being based on the properties and characteristics of the transformation into wavelets. According to another aspect, modification of the simple elements is applied to at least a spectral component resulting from the transformation into wavelets to target the part of the visual stream to be scrambled.

Advantageously, this process is without loss of quality. According to one aspect, the process comprises a supplementary stage of reconstructing the original stream that comprises:

a reconstruction stage by application of a reconstruction function from complementary information while providing a route that is separate from that of the principal stream; and a decoding stage of the stream reconstructed by a procedure adapted for the nominal stream.

The size of the stream reconstructed on the destination equipment may be equal to the size of the original stream. The size of the stream reconstructed on the destination equipment may be different from that of the original stream.

Advantageously, the complementary information allows for reconstruction of the original stream from the modified principal stream in which the order of the packets has been changed at the time of a code conversion carried out after the preparatory stage and before the reconstruction stage.

The invention concerns equipment to implement the process, comprising an encoder according to the nominal format, means for transmitting a numerical stream, means for processing the original stream by modifying at least one of the simple elements of the principal stream, and means to transfer the complementary information that corresponds to the modification.

The invention relates to another piece of equipment for the implementation of the process, comprising a decoder according to the nominal format, means of reception of a numerical stream, means of reception of complementary information associated with the principal stream, and means for reconstructing the original stream by processing the principal stream and the complementary information.

Finally, the invention concerns a system for distributing numerical fixed images comprising equipment for distributing fixed images encoded numerically in wavelets and a plurality of devices for restitution and means of telecommunication connecting the equipment for distributing and the equipment for restitution wherein the broadcasting equipment comprises means to modify at least one of the simple elements of the principal stream, and the means of telecommunication are composed of a first means for transmitting complementary information that corresponds to the modification, the reconstruction equipment comprises means to reconstruct the original stream by processing the principal stream and the complementary information and means for decoding information that results from the first transmission means.

Transformation of an image (a signal spatial in two dimensions) into wavelets comprises applying to the original image a succession of high pass and low pass filters elaborated from the characteristics of the wavelets of the analysis. The synthesis operation, which comprises reconstructing the image from the collection or a sub collection of the wavelet coefficients, obeys a scheme of inverse filtering.

Application of the stage of the transformation into wavelets to a numerical image (which can be composed of one or several matrices of real or integer values) is equivalent to an operation of filtering on the rows and columns of the matrix or the matrices of values following a dyadic reduction (division by two) in size. It thus generates in each stage 4 new matrices of wavelet coefficients, called "sub-bands" and whose width and height are equal to half of the transformed width and the height of the matrix (dyadic progression). Suppose an image of width L and height H and resolution r. Application of a stage of transformation into wavelets thus generates 4 matrices of wavelet coefficients of dimension (L/2, H/2): the sub-band $LL_{r-1}$, result of the low pass filtering horizontally (lines) and high pass vertically (columns) of the image I, the sub-band $LH_{r-1}$, result of the low pass filtering horizontally and high pass vertically, the sub-band $HL_{r-1}$, result of the high pass filtering horizontally and low pass vertically, and the sub-band $HH_{r-1}$, result of the high pass filtering horizontally and vertically.

One considers the transformation into wavelets at level R (equivalent to R stages) of an image. A transformation into wavelets at level R is associated with R+1 levels of resolution, numbering from R to 0, with R and 0 corresponding at the level of the highest (initial image) and the lowest resolution. Each sub-band resulting from the decomposition of the Image I into wavelets is thus identified by its orientation (LL or HL or LH or HZ) and its level of the corresponding resolution (0, . . . , R).

The original image is considered as the sub-band $LL_R$. At each level i of the decomposition into wavelets (except the last i=0), the sub-band $LL_i$ is thus decomposed into 4 new sub-bands $LL_{i-1}$, $HL_{i-1}$, $LH_{i-1}$ and $HH_{i-1}$ and whose size is divided by two due to $LL_i$. The process is iterated until the sub-band $LL_0$ has been obtained. Therefore, for a transformation into wavelets at level R, 3R+1, sub-bands of wavelet coefficients are generated: $LL_0$, $HL_1$, $LH_1$, $HH_1$, $HL_2$, $LH_2$, $HH_2$, . . . , $HL_R$, $LH_R$, $HH_R$.

Reconstruction of the image (synthesis) from the 3R+1 sub-bands comprises applying an inverse filtering operation on the wavelet coefficients followed by a dyadic increase in size. A progressive reconstruction of the image according to different levels of resolution can also be performed. By adding, for example, to the reconstructed image of resolution r−1, the 3 sub-bands of wavelet coefficients $HL_{r-1}$, $LH_{r-1}$, $HH_{r-1}$ a new level of resolution r is obtained.

The unique sub-band of wavelet coefficients $LL_0$ is an approximation of the original image $LL_R$ and whose resolution is $2^R$ times inferior to the original image.

The 3R sub-bands of wavelet coefficients $HL_{r-1}$, $LH_{r-1}$, and $HH_{r-1}$, correspond in themselves to the details in the image, extracts on resolution level r−1. The larger the value of r, the more are the wavelet coefficients of these sub-bands characteristic of details more and more fine (small) in the original image.

The wavelet coefficients resulting from the transformation of an image into wavelets are thus the local characteristics of frequential information. The more r decreases the more the spatial extent, characterized by a wavelet coefficient, increases (multiplication by a factor 4 at each stage).

A transformation of an image into wavelets at level R generates an approximate "image" of inferior resolution $2^R$ and 3R "images" of details at different resolutions (0 to R).

From this modeling, encoding in wavelets is characterized by its spatial and qualitative scalability (or granularity), which makes it possible to obtain various resolutions for the encoded images and also allows realization of an adaptive and progressive scrambling. An example application is for a sequence of fixed images encoded with the "Motion JPEG-2000" standard. A progressive scrambling is applied so that the user begins to watch the succession of unscrambled images. Next, a weak scrambling is applied that increases more and more until the images are entirely scrambled. The sought after goal is to attract the interest of the user for the succession of images, but to deny the rights to watch them if the latter has not purchased them. One realization of this application is to scramble the succession of images with one or several given algorithms that modify progressively the parameters of the scrambling for a time period determined in a way to increase the discomfort until the images are completely scrambled and not visible.

The scrambling procedure of the images whose compression scheme utilizes the transformations into wavelets comprises introducing perturbations in the wavelet coefficients that belong to one or several different sub-bands. A "perturbation" is defined as being a change of value or a permutation. Advantageously, the perturbation can also be a substitution by a random or calculated value. The amplitude and position of the wavelet coefficients, being characteristics of the frequencies and the spatial information present in the image, and this at several levels of resolution, frequential and spatial perturbations will be generated on an image that is reconstructed from modified wavelet coefficients. Therefore, a coefficient of large amplitude signals the presence of a local discontinuity in the intensity (detail) in the image of which the "size" is measured as a function of the resolution r of the sub-band: The finer discontinuities are extracted for a large r and the larger for a small r. By modifying the amplitude and/or the position of one or several coefficients at one or several resolutions r, visual perturbations are introduced in the reconstructed image.

The human eye is essentially sensitive to the discontinuities in the image. They are the ones that carry the maximum amount of visual information. The discontinuities can be due to physical and/or geometrical properties of the objects present in the image. By perturbing the wavelet coefficients belonging to one or several of the 3x(R−1) sub-bands of details LH, HL, and HH, it is the primordial information with the general interpretation of an image that is perturbed to the extent of being destroyed. Advantageously, the wavelet coefficients of the band $LL_0$ are modified.

Another example of scrambling directed spatially, comprises modifying wavelet coefficients, which are attached to a particular entity "tile-precinct." A "tile" is a composite that results from partition of the original image into several rectangular connected regions. A "precinct" is a rectangular zone that regroups three sub-bands of wavelet coefficients belonging to the sub-bands LH, HL, and HH, respectively, for a spatial region limited in the image and for a fixed resolution. Another example of scrambling oriented spectrally comprises modifying the wavelet coefficients generated by decomposition of one of the spectral or colorimetric components of the image.

Perturbations that are oriented spectrally (choice of one component for an image color) and/or spatially (choice of a tile and/or a precinct) can thus be applied.

Another example of scrambling comprises working at different resolutions. Perturbation is applied to the wavelet coefficients belonging to one of the or the sub-bands of the same level of resolution r. Moreover, the effects of perturbation will be visible on each tile of the image that is reconstructed from the perturbed coefficients and higher resolutions i.e. r+1, r+2, . . . R. The smaller r is, that is the more the perturbed wavelet coefficients belonging to sub-bands of lower and lower resolutions, the more the influence of the perturbations will be important and capable of being more visible and awkward as for the comprehension and/or utilization of the original information contained in the image.

From its nature, encoding in wavelets provides multiple possibilities of simple or progressive scrambling, this as a function of the belonging to one of the sub-bands of the coefficients that carry the disturbances: by modifying the wavelet coefficients belonging to a sub-band HL the vertical discontinuities of the reconstructed image are degraded, by modifying the wavelet coefficients belonging to a sub-band LH the horizontal discontinuities of the reconstructed image are degraded, by modifying the wavelet coefficients belonging to a sub-band HH the diagonal discontinuities of the reconstructed image are degraded.

Therefore, as a function of belonging to a sub-band of the wavelet coefficients which carry the perturbations, the geometrical aspect of the defects that will be introduced can be controlled.

Therefore, as a function of the intensity and nature of perturbations introduced in the coefficients of the modified, substituted, or permuted wavelets, a progressive and qualitative scrambling of the image can be carried out.

Scrambling an image or a succession of images encoded as wavelets can be controlled according to 4 axes of action: a spectral axis (choice of one or several components), a spatial axis (choice of one or several tiles, of one or several precincts), a resolution axis (level r of resolution to scrambling and extended in the scrambling), and finally, a qualitative axis (choice of one or several sub-bands from LL, HL, LH, or HH, choice of the nature and the intensity of the perturbations).

An adaptive and progressive scrambling is carried out as a function of the parameters of the initial encoding of the image (number of components, number R of the level of decomposition). Different scenarios can therefore be envisioned: scrambling a specific zone of an image (choice of a tile or a precinct), scrambling a specific component of an image (luminance or chrominance, red, green, or blue), scrambling a certain level of resolution, scrambling according to the variable directions (as a function of the perturbed sub-band). The numerous scenarios combine the preceding variations or according to the 4 axes defined previously are equally possible.

The different perturbations and modifications of the envisioned wavelet coefficients are, for example, the modification of the values of the coefficients by thresholding, addition/substitution of noise, permutation, substitution by one or several random values, change of sign.

A thresholding operation comprises forcing to a new value nval one or several wavelet coefficients $c_i$ if their images calculated by a function F (defined according to a heuristic method) are below a threshold τ fixed earlier:

If $F(c_i) \geq \tau$ then $c_i = nval$.

Different functions F, different thresholds as a function of F and another perturbation comprises adding/substituting a noise, that is in adding/substituting to the value of one or several wavelet coefficients $c_i$ a random noise or pseudo-random from a known statistical law. As a function of the power of the noise, the intensity of the perturbation is adjustable.

Another perturbation comprises permuting, according to a deterministic or random scheme, the position of the coefficients in a sub-band or several fixed sub-bands.

Scrambling of images encoded in wavelets is carried out as well in an adaptive way as a function of the client's profile. One applies an adaptation of the parameters and algorithms of the cited scrambling as a function of the profile of the destination, as a function of the behavior of the destination during the connection to the server (for example, the regularity and the acceptance of payments), as a function of habits (for example, time, hour of connection), as a function of characteristics (for example, age, sex, religion, community), or as a function of the data communicated by a third party (for example, belonging to associations or a walk-on role based on the data of the consumers). One applies also an adaptation of the parameters and algorithms of the scrambling as a function of external events, for example, hour of the broadcast, size of the audience, social-political events, and perturbations during the connection.

The invention will be better understood with the aid of the description made hereafter on a purely explanatory basis, of one of the invention, in reference to the attached figure, wherein FIG. 1 illustrates a client-server system of the invention.

The image encoded (1) according to the JPEG-2000 standard, that one wishes to secure is sent to a system of analysis (121) and of scrambling (122) intended for generating the modified principal stream (124) and complementary information (123).

The original stream (1) can be directly in a numerical form (10) of in an analog form (11). In the latter case, the analog stream (11) is converted by an encoder that is not represented in a numerical format (10). In the following of the text, we will not (1) the binary input stream.

A first stream (124) in JPEG-2000 format, of a format identical to the numerical input stream (1) apart from certain coefficients, values and/or vectors that have been modified, is placed in an output memory buffer (125). The complementary information (123), of whatever format, contains reference to the parts of the elements that have been modified and is placed in the buffer (126). As a function of the characteristics of the input stream (1), the systems of analysis (121) and scrambling (122) decide what scrambling applies and which parameters of the stream are to be modified as a function of the type of encoder with which it has been encoded, for example, JPEG-2000, JJ2000, JASPER, Kakadu, Motion JPEG-2000, Still Texture in MPEG-4 and the like).

The modified JPEG-2000 stream is next transmitted from the buffer (125), via a high bandwidth network (4) of the type wireless, cable, satellite and the like to the client (8), and, more precisely, to its memory (81) of the type RA, ROM, or hard disk. When the client desires to see an image present in the memory (61), the destination equipment (8) sends a request to the server (12) which verifies the rights of this user. Two eventualities are therefore possible:

the destination (8) does not posses the necessary rights to watch the image. In this case, the stream (124) generated by the scrambling system (122) present in its memory (81) is dispatched to a synthesis system (82) that does not modify it and that transmits it identical to a reader (83) and the contents of the image, strongly degraded visually are displayed on a visualization screen (9); or the destination (8) does have the rights to view the image. As a function of the rights of the user, the server (12) transmits the appropriate complementary information (123) that is stored, in totality or partially, in the buffer (126) by the link (6). In that case, the synthesis system issues a request for visualization to the server (12) that contains the complementary information (123) necessary for reconstitution of the original image (1). The server (12) then sends by the connection (6) via telecommunications networks (6) of the type standard analog or numerical telephone line, DSL (Digital Subscriber Line), BLR (Local Radio Loop), DAB (Digital Audio Broadcasting) or of mobile numerical telecommunication (GSM, GPRS, UMTS), the complementary information (123) that allows reconstruction of the initial image in a manner that the client (8) can watch the image. The synthesis system (82) proceeds with descrambling the image by reconstruction of the original stream by combining the modified principal stream (124) and the complementary information (123). The image obtained at the output of the synthesis system (82) is next transmitted to a traditional reader (83) that displays it on a screen (9).

The invention concerns more particularly the analysis (121) and scrambling (122) modules, given the complexity and the property of multi-layers and scalability of the streams encoded in wavelets.

An example of scrambling carried out by the scrambling module is saturation of the wavelet coefficients relative to the details. This method comprises forcing the value of one or several wavelet coefficients c belonging to one or several of the sub-bands $HL_r$, $LH_r$, $HH_r$ (r remains fixed) to a value nval if their amplitudes (modules) are higher than threshold:

If $|c| \geq$ threshold, $c = nval$.

The value threshold influences the number of modified wavelet coefficients in a sub-band: the smaller threshold is, the more important will be the number of modified coefficients and the larger will be the degradations.

Scrambling is adaptive as a function of the modified sub-band. Distribution of the values of the wavelet coefficients in a sub-band can be modeled by a Laplacian distribution. The larger r is, the more spread out is the distribution, that is, one finds more and more wavelet coefficients of large amplitudes. Therefore, for a fixed threshold, the number of modified coefficients in every sub-band is not constant.

The value nval rules the intensity of the degradation introduced in the reconstructed image. The larger the absolute value |nval|, the more important will be the visual intensity of the introduced artifacts.

If the modified wavelet coefficients belong to the sub-band HL the artifacts appear in a vertical direction in the reconstructed image.

If the modified wavelet coefficients belong to the sub-band LH the artifacts in a horizontal direction in the reconstructed image.

If the modified wavelet coefficients belong to the sub-band HH, the artifacts appear in a checkerboard pattern in the reconstructed image.

The value r rules as to the level of the resolution where the defects are introduced. The smaller r is, the more will the degradation be spatially extended in the reconstructed image.

The complementary information (123) is then composed from the wavelet coefficients c replaced by nval and their position in the transformed image.

Another example of scrambling realized by the module (122) is substitution of the original coefficients by the wavelet coefficients to which one adds noise. The idea is to add/substitute to/in the coefficients one or several bands a random or pseudo-random value generated according to given probability law. For example, in the case of white additive noise, $$ci = ci + \sigma ei,$$

with ei a random variable generated according to a law N(0,1) (normal law with average zero and variance 1.0) and σ the power of the noise.

The complementary information (123) is then composed from the characteristics of the added noise and the subtraction function of this noise for the modified coefficients.

Another aspect of the scrambling is permutation of the wavelet coefficients. The idea is basically to permute, in a deterministic or random way, the coefficients belonging to one or several sub-bands. Permutations can be carried out in a deterministic (and characterized by a permutation matrix P) or in a random manner on the totality of the rows and columns of coefficients, or still between the sub-collections of coefficients. For example, permutations that are deterministic, of the lines in the sub-bands HL, HH, and which are random, of the lines in the sub-bands LH (horizontal details).

The obtained visual effect is a strong degradation of the image in the permutated zones, the effects of blurring and degradations of the contours.

In this type of scrambling, the complementary information (123) constitutes inverse permutation functions of the permutations realized by the scrambling device (123).

Another mode of realization of the scrambling is to substitute in the wavelet coefficients belonging to a resolution level r, random wavelet coefficients chosen according to a uniform probability law. The obtained visual effect is a destruction of the details of the image at resolutions r, r+1, ..., R, therefore bringing about a strong visual degradation. According to this type of scrambling, the complementary information (123) constitutes original wavelet coefficients and their placements in the initial stream.

The decomposition into wavelets also permits a localized scrambling of an image or a succession of images. The idea is to degrade, according to one of the three preceding methods (threshold, permutation, noise), a part of the image, in targeted way, that is uniquely the zones of interest that make the image not acceptable from the viewpoint of human visual perception. In this way one obtains a disagreeable effect, all while limiting the amount of complementary information. An example of a realization that illustrates the principle is described below.

Let (L,H) be the size of the original image and (l,h) the size of the zone that one wants to scramble on the original image. To simplify, the zone to scramble is situated in the center of the image, that is the zone where in general the information that is more pertinent is located in the image.

Let r be the resolution level of the sub-band of the wavelet coefficients that one wants to modify. Therefore, the following formulas indicate the intervals [is, js] and [ie, je] the indices of the wavelet coefficients to modify in the sub-band of the considered resolution r:

$$is=nlr/2-(1/2^{r+1}), je=ncr/2-(h/2^{r+1}),$$

$$ie=nlr/2+(1/2^{r+1}), je=ncr/2+(h/2^{r+1}),$$

where (nlr, ncr) are the numbers of rows and columns, respectively, of the matrix of the wavelet coefficients in the considered sub-band.

The cited examples are not limiting and illustrate the principle of modifications of a numerical stream resulting from the encoding of an image in wavelets with the goal to protect them, this principle is also applicable to a whole succession of numerical images encoded in wavelets.

The invention claimed is:

1. A process for secured distribution of fixed numerical images according to a nominal format resulting from numerical encoding in wavelets, comprising:
   modifying at least one simple element of a block of a packet representing an original stream according to at least a substitution operation comprising extracting the simple element, followed by replacement of the simple element by lure data; and
   modifying a principal stream to conform to a nominal format comprising modified blocks and packets; and
   transmitting, by a path that is separate from the principal stream, complementary numerical information associated with the principal stream, to enable reconstruction of the original stream at destination equipment based on the principal stream and the complementary numerical information.

2. The process according to claim 1, wherein the modified principal stream is recorded or available on the destination equipment before transmission of the complementary numerical information to the destination equipment.

3. The process according to claim 1, wherein the modified principal stream and the complementary numerical information are transmitted together in real time at a moment of visualization.

4. The process according to claim 1, wherein the format of a nominal stream resulting from encoding in wavelets is defined by a standard or an encoder common to a group of users.

5. The process according to claim 1, further comprising analyzing at least a part of the original stream and determining the nature of modifications to be made to the simple elements.

6. The process according to claim 5, wherein determining modifications of the simple elements is carried out during the analysis and accounts for at least a part of an original image.

7. The process according to claim 1, wherein the process is applied to an analog visual signal before analog/numerical conversion.

8. The process according to claim 1, further comprising transmitting, along with the complementary numerical information, at least one numerical routine capable of executing a function.

9. The process according to claim 1, wherein modification is adaptive on the original stream as a function of a part of at least one of representative characteristics of structure, content and parameters of an original image, profile of the destination, or external events.

10. The process according to claim 1, wherein the modified principal stream conforms to a norm or a native standard of the original stream.

11. The process according to claim 1, wherein a size of the modified principal stream is equal to a size of the original stream.

12. The process according to claim 1, wherein modifications are made directly on packets of an initial binary stream regrouping blocks of encoded simple elements.

13. The process according to claim 1, wherein modifications are made on at least one simple element obtained by decoding at least one packet of an initial binary stream.

14. The process according to claim 1, wherein modifications are carried out on at least one spatial scalability level of fixed images encoded in the wavelets.

15. The process according to claim 1, wherein modifications are carried out on at least qualitative scalability of fixed images encoded in the wavelets.

16. The process according to claim 1, wherein modifications are carried out on at least one collection of at least one simple element as a function of parameters of modifications made before on at least one collection of at least one simple element inside the same stream.

17. The process according to claim 1, wherein the fixed numerical images constitute a succession of images in time.

18. The process according to claim 17, wherein modification of the simple elements is different for at least two successions of images.

19. The process according to claim 17, wherein modification of the simple elements of an image of the succession includes modification of the simple elements of preceding images in a temporal order of succession founded on spatial and qualitative scalability properties of transformations into the wavelets.

20. The process according to claim 1, wherein modification of the simple elements is applied to a spatial part of an image only, determined while being based on properties and characteristics of a transformation into the wavelets.

21. The process according to claim 1, wherein modification of the simple elements is applied to at least one spectral component resulting from transformation into wavelets to target a part of the original stream to scramble.

22. The process according to claim 1, wherein modification occurs without loss of quality.

23. The process according to claim 1, further comprising:
applying a reconstruction function transmitted with the complementary numerical information while providing a route that is separate from a vector of the principal stream; and decoding the stream reconstructed at the destination equipment by a procedure adapted for the nominal format.

24. The process according to claim 23, wherein a size of the stream reconstructed on the destination equipment is equal to a size of the original stream.

25. The process according to claim 23, wherein a size of the stream reconstructed on the destination equipment is different from a size of the original stream.

26. The process according to claim 23, wherein the complementary numerical information allows reconstruction of the original stream from the modified principal stream in which the order of the packets has been changed during an operation of code conversion.

27. An apparatus for the secured distribution of fixed numerical images according to a nominal stream format, comprising:
an encoder to set into motion a numerical encoding into wavelets according to the nominal stream format;
means for transmitting a numerical stream;
means for processing an original stream by modifying at least one simple element of a principal stream conforming to the nominal stream format according to at least a substitution operation comprising extracting the simple element, followed by replacement of the simple element by lure data; and
means for transferring, by a path that is separate from the principal stream, complementary information corresponding to the modification.

28. An apparatus for restoration of fixed numerical images according to a nominal format of images, comprising:
a decoder according to the nominal format;
means for receiving a numerical stream comprising a principal stream in which at least one simple element of the principal stream is modified according to at least a substitution operation comprising extracting the simple element, followed by replacement of the simple element by lure data;
means for receiving complementary information associated with the principal stream; and
means for reconstruction of an original stream from calculations as a function of the principal stream and the complementary information.

* * * * *

UNITED STATES PATENT AND TRADEMARK OFFICE
CERTIFICATE OF CORRECTION

| | | |
|---|---|---|
| PATENT NO. | : 8,094,953 B2 | |
| APPLICATION NO. | : 12/408877 | |
| DATED | : January 10, 2012 | |
| INVENTOR(S) | : Lecomte et al. | |

It is certified that error appears in the above-identified patent and that said Letters Patent is hereby corrected as shown below:

Title page, item (57), under "Abstract", in Column 2, Line 3, delete "a original" and insert
-- an original --.

Signed and Sealed this
Twenty-sixth Day of June, 2012

David J. Kappos
*Director of the United States Patent and Trademark Office*